(12) United States Patent
Rasch et al.

(10) Patent No.: US 11,361,218 B2
(45) Date of Patent: Jun. 14, 2022

(54) NOISE AND SIGNAL MANAGEMENT FOR RPU ARRAY

(71) Applicant: International Business Machines Corporation, Armonk, NY (US)

(72) Inventors: Malte Rasch, Chappaqua, NY (US); Tayfun Gokmen, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 16/427,559

(22) Filed: May 31, 2019

(65) Prior Publication Data

US 2020/0380348 A1  Dec. 3, 2020

(51) Int. Cl.
  *G06N 3/06* (2006.01)
  *G06N 3/08* (2006.01)
  *G06N 3/063* (2006.01)

(52) U.S. Cl.
  CPC .......... *G06N 3/0635* (2013.01); *G06N 3/084* (2013.01)

(58) Field of Classification Search
  CPC ......... G06N 3/0635; G06N 3/08; G06N 3/084
  See application file for complete search history.

(56) References Cited

U.S. PATENT DOCUMENTS

| | | |
|---|---|---|
| 5,500,905 A | 3/1996 | Martin et al. |
| 5,848,073 A | 12/1998 | Abdelmonem et al. |
| 6,054,710 A | 4/2000 | Bruggeman |
| 6,078,843 A | 6/2000 | Shavit |
| 9,646,243 B1 | 5/2017 | Gokmen |
| 10,192,161 B1 | 1/2019 | Khan et al. |
| 2016/0217368 A1* | 7/2016 | Ioffe ................... G06K 9/6277 |
| 2016/0307098 A1 | 10/2016 | Goel et al. |
| 2017/0109628 A1 | 4/2017 | Gokmen et al. |
| 2018/0293208 A1 | 10/2018 | Gokmen et al. |
| 2018/0293209 A1 | 10/2018 | Gokmen et al. |
| 2018/0336460 A1 | 11/2018 | Tschemezki et al. |
| 2020/0117975 A1* | 4/2020 | Harang ................ G06K 9/6281 |
| 2021/0365786 A1* | 11/2021 | Abolmaesumi ...... G06N 3/0445 |

OTHER PUBLICATIONS

Alex Krizhevsky et al., "ImageNet Classification with Deep Convolutional Neural Networks," Advances in Neural Information Processing Systems, Jan. 2012, pp. 1097-1105.

Sergey Ioffe et al., "Batch Normalization: Accelerating Deep Network Training by Reducing Internal Covariate Shift," arXiv preprint arXiv:1502.03167, Mar. 2015 (11 pages).

(Continued)

*Primary Examiner* — Hal Schnee
(74) *Attorney, Agent, or Firm* — Randall Bluestone; Michael J. Chang, LLC (57) ABSTRACT

Advanced noise and signal management techniques for RPU arrays during ANN training are provided. In one aspect of the invention, a method for ANN training includes: providing an array of RPU devices with pre-normalizers and post-normalizers; computing and pre-normalizing a mean and standard deviation of all elements of an input vector x to the array that belong to the set group of each of the pre-normalizers; and computing and post-normalizing the mean $\mu$ and the standard deviation $\sigma$ of all elements of an output vector y that belong to the set group of each of the post-normalizers.

22 Claims, 6 Drawing Sheets

(56) References Cited

OTHER PUBLICATIONS

Kim et al., "Analog CMOS-based Resistive Processing Unit for Deep Neural Network Training," 2017 IEEE 60th International Midwest Symposium on Circuits and Systems (MWACAS), (Aug. 2017) (4 pages).

Rumelhart et al., "Learning representations by back-propagating errors," Nature 323, pp. 533-536 (Oct. 1986).

Gokmen et al., "Training Deep Convolutional Neural Networks with Resistive Cross-point Devices," Frontiers in Neuroscience, vol. 11, article 538 (Oct. 2017) (13 pages).

LeCun et al., Deep Learning, Nature 521, pp. 436-444 (May 2015).

International Search Report and Written Opinion for PCT/IB2020/053407 dated Jun. 22, 2020 (9 pages).

\* cited by examiner

NOISE AND SIGNAL MANAGEMENT FOR RPU ARRAY

FIELD OF THE INVENTION

The present invention relates to training of artificial neural networks (ANNs) having analog cross-point arrays of resistive processing unit (RPU) devices, and more particularly, to advanced noise and signal management techniques for RPU arrays during ANN training.

BACKGROUND OF THE INVENTION

An artificial neural network (ANN) can be embodied in an analog cross-point array of resistive devices such as the resistive processing units (RPUs) described in U.S. Patent Application Publication Number 2017/0109628 by Gokmen et al., entitled "Resistive Processing Unit" (hereinafter "U.S. Patent Application Publication Number 2017/0109628"), the contents of which are incorporated by reference as if fully set forth herein. As described in U.S. Patent Application Publication Number 2017/0109628, each RPU includes a first terminal, a second terminal and an active region. A conductance state of the active region identifies a weight value of the RPU, which can be updated/adjusted by application of a signal to the first/second terminals.

ANN-based models have been used for a variety of different cognitive based tasks such as object and speech recognition and natural language processing. See, for example, Gokmen et al., "Training Deep Convolutional Neural Networks with Resistive Cross-point Devices," Frontiers in Neuroscience, vol. 11, article 538 (October 2017) (13 pages), the contents of which are incorporated by reference as if fully set forth herein. Neural network training is needed to provide a high level of accuracy when performing such tasks.

However, the vector-matrix multiplication operations performed on an RPU array are analog in nature and thus prone to various sources of noise. When the input values to the RPU array are small (such as for the backward cycle pass), the output signal y can be buried by the noise, thus producing an incorrect result (i.e., $y = W \cdot \delta + noise$, $W \cdot \delta \ll noise$). See, for example, U.S. Patent Application Publication Number 2018/0293209 by Gokmen et al., entitled "Noise and Bound Management for RPU Array" (hereinafter "U.S. Patent Application Publication Number 2018/0293209"), the contents of which are incorporated by reference as if fully set forth herein. With analog noise as a factor, accurate ANN training with such analog RPU arrays is difficult.

Therefore, techniques for minimizing the impact of analog noise during ANN training would be desirable.

SUMMARY OF THE INVENTION

The present invention provides advanced noise and signal management techniques for resistive processing unit (RPU) arrays during artificial neural network (ANN) training. In one aspect of the invention, a method for ANN training with noise and signal management is provided. The method includes: providing an array of RPU devices with pre-normalizers configured to handle a set group of size g of n elements of an input vector x to the array and post-normalizers configured to handle a set group of size g of m elements of an output vector y from the array, wherein the array represents a weight matrix W of the ANN having m rows and n columns, and wherein weight values w of weight matrix W are stored as resistive values of the RPU devices; computing a mean $\mu$ and a standard deviation $\sigma$ of all elements of the input vector x that belong to the set group of each of the pre-normalizers across N vectors producing current mean $\mu$ and standard deviation $\sigma$ values for the pre-normalizers, wherein the mean $\mu$ and the standard deviation $\sigma$ are computed over N times g input values; updating previously stored mean $\mu$ and standard deviation $\sigma$ values for the pre-normalizers with a discounting factor $\alpha$ and the current mean $\mu$ and standard deviation $\sigma$ values for the pre-normalizers producing updated stored mean $\mu$ and standard deviation $\sigma$ values for the pre-normalizer; pre-normalizing the N times g input values using the updated stored mean $\mu$ and standard deviation $\sigma$ values for the pre-normalizers producing N normalized input vectors $x_{norm}$ from all of the pre-normalizers, to compute $W^* x_{norm}$ with analog noise in a forward cycle pass through the array; computing the mean $\mu$ and the standard deviation $\sigma$ of all elements of the output vector y that belong to the set group of each of the post-normalizers across the N vectors producing current mean $\mu$ and standard deviation $\sigma$ values for the post-normalizers, wherein the mean $\mu$ and the standard deviation $\sigma$ are computed over N times g output values; updating previously stored mean $\mu$ and standard deviation $\sigma$ values for the post-normalizers with the discounting factor $\alpha$ and the current mean $\mu$ and standard deviation $\sigma$ values for the post-normalizers producing updated stored mean $\mu$ and standard deviation $\sigma$ values for the post-normalizer; post-normalizing the N times g output values using the updated stored mean $\mu$ and standard deviation $\sigma$ values for the post-normalizers producing N normalized output vectors $y_{norm}$ from all of the post-normalizers; transforming N input vectors d using the previous standard deviation $\sigma$ producing N transformed input vectors $d_{norm}$ to compute $W^T * d_{norm}$ with analog noise in a backward cycle pass through the array; and transforming N output vectors d' using the previous standard deviation $\sigma$ for the pre-normalizers to produce N transformed output vectors $d'_{norm}$.

A more complete understanding of the present invention, as well as further features and advantages of the present invention, will be obtained by reference to the following detailed description and drawings.

DETAILED DESCRIPTION OF PREFERRED EMBODIMENTS

As highlighted above, artificial neural network (ANN) training with analog resistive cross-bar arrays such as analog resistive processing unit (RPU) arrays is difficult due to analog noise. Further, the training process is limited by the bounded ranges of the analog-to-digital converters (ADC) and digital-to-analog converters (DAC) employed for the array. Namely, as will be described in detail below, an DAC and ADC are used to convert digital input to the RPU to an analog signal, and the output from the RPU back to a digital signal, respectively.

Advantageously, provided herein are techniques for normalizing the input and output accordingly to overcome these noise and signal bound limitations. For instance, as will be described in detail below, normalization of the inputs to the RPU array (i.e., to zero mean and variance) is performed by computing and storing the mean and variance over multiple input values and/or sets of input values, and updating the mean and variance in a running average fashion.

Figure 1:
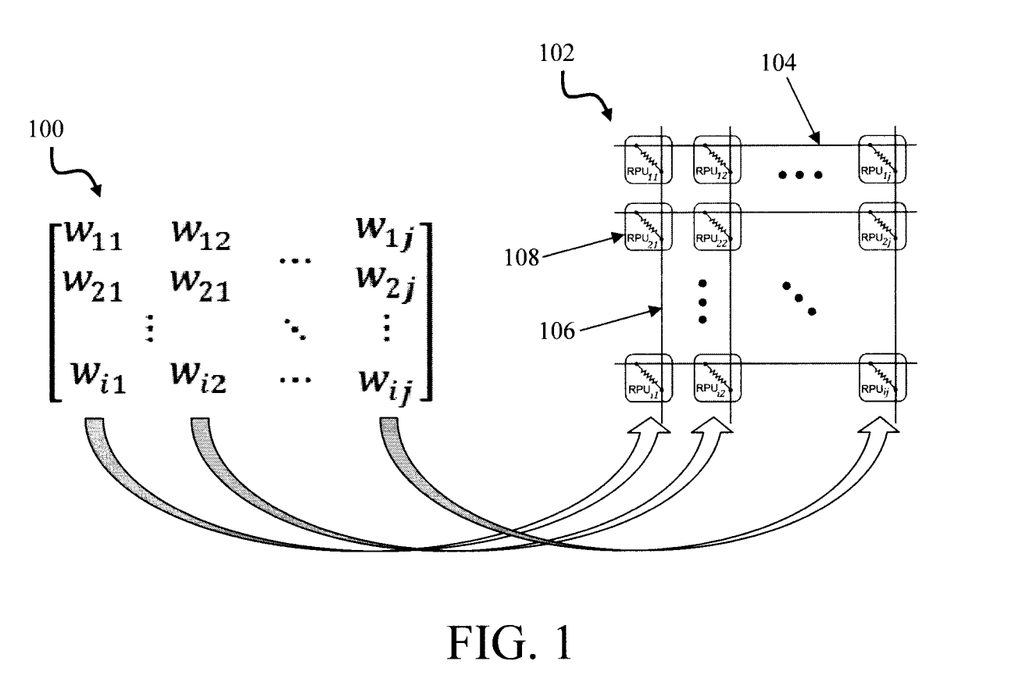
FIG. 1 is a diagram illustrating an artificial neural network (ANN) embodied in an analog cross-point array of resistive processing unit (RPU) devices according to an embodiment of the present invention.

As provided above, an ANN can be embodied in an analog cross-point array of RPU devices. See, for example, FIG. 1. As shown in FIG. 1, each parameter (weight $w_{ij}$) of algorithmic (abstract) weight matrix 100 is mapped to a single RPU device ($RPU_{ij}$) on hardware, namely a physical cross-point array 102 of RPU devices. The cross-point array 102 has a series of conductive row wires 104 and a series of conductive column wires 106 oriented orthogonal to, and intersecting, the conductive row wires 104. The intersections of the conductive row wires 104 and column wires 106 are separated by RPU devices 108 forming cross-point array 102 of RPU devices 108. As described in U.S. Patent Application Publication Number 2017/0109628, each RPU device 108 can include a first terminal, a second terminal and an active region. A conduction state of the active region identifies a weight value of the RPU device 108, which can be updated/adjusted by application of a signal to the first/second terminals. Further, three-terminal (or even more terminal) devices can serve effectively as two-terminal resistive memory devices by controlling the extra terminals. For a description of three-terminal RPU devices see, for example, Kim et al., "Analog CMOS-based Resistive Processing Unit for Deep Neural Network Training," 2017 IEEE 60$^{th}$ International Midwest Symposium on Circuits and Systems (MWACAS), (August 2017) (4 pages), the contents of which are incorporated by reference as if fully set forth herein.

Each RPU device 108 ($RPU_{ij}$) is uniquely identified based on its location in (i.e., the i$^{th}$ row and j$^{th}$ column) of the cross-point array 102. For instance, going from the top to bottom, and from the left to right of cross-point array 102, the RPU device 108 at the intersection of the first conductive row wire 104 and the first conductive column wire 106 is designated as $RPU_{11}$, the RPU device 108 at the intersection of the first conductive row wire 104 and the second conductive column wire 106 is designated as $RPU_{12}$, and so on. The mapping of the weight parameters in weight matrix 100 to the RPU devices 108 in cross-point array 102 follows the same convention. For instance, weight $w_{i1}$ of weight matrix 100 is mapped to $RPU_{i1}$ of the cross-point array 102, weight $w_{i2}$ of weight matrix 100 is mapped to $RPU_{i2}$ of the cross-point array 102, and so on.

The RPU devices 108 of the cross-point array 102 function as the weighted connections between neurons in the ANN. The resistance of the RPU devices 108 can be altered by controlling the voltages applied between the individual conductive row and column wires 104 and 106. Altering the resistance is how data is stored in the RPU devices 108 based, for example, on a high resistance state or a low resistance state. The resistance state of the RPU devices 108 is read by applying a voltage and measuring the current that passes through the target RPU device 108. All of the operations involving weights are performed fully in parallel by the RPU devices 108.

In machine learning and cognitive science, ANN-based models are a family of statistical learning models inspired by the biological neural networks of animals, and in particular the brain. These models may be used to estimate or approximate systems and cognitive functions that depend on a large number of inputs and weights of the connections which are generally unknown. ANNs are often embodied as so-called "neuromorphic" systems of interconnected processor elements that act as simulated "neurons" that exchange "messages" between each other in the form of electronic signals. The connections in ANNs that carry electronic messages between simulated neurons are provided with numeric weights that correspond to the strength or weakness of a given connection. These numeric weights can be adjusted and tuned based on experience, making ANNs adaptive to inputs and capable of learning. For example, an ANN for handwriting recognition is defined by a set of input neurons which may be activated by the pixels of an input image. After being weighted and transformed by a function determined by the network's designer, the activations of these input neurons are then passed to other downstream neurons. This process is repeated until an output neuron is activated. The activated output neuron determines which character was read.

As will be described in further detail below, an ANN can be trained with an incremental or stochastic gradient descent (SGD) process, in which the error gradient of each parameter (weight $w_{ij}$) is calculated using backpropagation. See, for example, Rumelhart et al., "Learning representations by back-propagating errors," Nature 323, pp. 533-536 (October 1986), the contents of which are incorporated by reference as if fully set forth herein. Backpropagation is performed in three cycles, a forward cycle, a backward cycle, and a weight update cycle which are repeated multiple times until a convergence criterion is met.

ANN based models are composed of multiple processing layers that learn representations of data with multiple levels of abstraction. See, for example, LeCun et al., "Deep Learning, Nature 521, pp. 436-444 (May 2015), the contents of which are incorporated by reference as if fully set forth herein. For a single processing layer where N input neurons are connected to M output neurons, the forward cycle involves computing a vector-matrix multiplication (y=Wx) where the vector x of length N represents the activities of the input neurons, and the matrix W of size M×N stores the weight values between each pair of the input and output neurons. The resulting vector y of length M is further processed by performing a non-linear activation on each of the resistive memory elements and then passed to the next layer.

Once the information reaches to the final output layer, the backward cycle involves calculating the error signal and backpropagating the error signal through the ANN. The backward cycle on a single layer also involves a vector-matrix multiplication on the transpose (interchanging each row and corresponding column) of the weight matrix ($z=W^T\delta$), where the vector $\delta$ of length M represents the error calculated by the output neurons and the vector z of length N is further processed using the derivative of neuron non-linearity and then passed down to the previous layers.

Lastly, in the weight update cycle, the weight matrix W is updated by performing an outer product of the two vectors that are used in the forward and the backward cycles. This outer product of the two vectors is often expressed as $W \leftarrow W+\eta(\delta x^T)$, where $\eta$ is a global learning rate.

All of the operations performed on the weight matrix W during this backpropagation process can be implemented with the cross-point array 102 of RPU devices 108 having a corresponding number of m rows and n columns, where the stored conductance values in the cross-point array 102 form the matrix W. In the forward cycle, input vector x is transmitted as voltage pulses through each of the conductive column wires 106, and the resulting vector y is read as the current output from the conductive row wires 104. Similarly, when voltage pulses are supplied from the conductive row wires 104 as input to the backward cycle, a vector-matrix product is computed on the transpose of the weight matrix $W^T$. Finally, in the update cycle voltage pulses representing vectors x and $\delta$ are simultaneously supplied from the conductive column wires 106 and the conductive row wires 104. Thus, each RPU device 108 performs a local multiplication and summation operation by processing the voltage pulses coming from the corresponding conductive column wire 106 and conductive row wire 104, thus achieving an incremental weight update.

As provided above, the operations performed on an RPU array are analog in nature and thus prone to various sources of noise. See, for example, U.S. Patent Application Publication Number 2018/0293209 by Gokmen et al., entitled "Noise and Bound Management for RPU Array" (hereinafter "U.S. Patent Application Publication Number 2018/0293209"), the contents of which are incorporated by reference as if fully set forth herein.

With noise management approaches such as those described in U.S. Patent Application Publication Number 2018/0293209, the output noise amplitude is on the order of a max ($|(x_j)|$) where $\sigma$ (sigma) is the standard deviation of the analog noise of the RPU array. For additional details on RPU arrays see, for example, U.S. Pat. No. 9,646,243 issued to Gokmen, entitled "Convolutional Neural Networks Using Resistive Processing Unit Array," the contents of which are incorporated by reference as if fully set forth herein.

The signal-to-noise ratio (SNR) of the RPU array computation is approximately:

$$SNR \approx \frac{\|y\|}{\sigma\|x\|} \propto \frac{\|W\|}{\sigma} \quad (1)$$

since it is $\|y\| \propto \|W\|\|x\|$. Thus, a way to improve the SNR by the stochastic gradient descent process is to increase the weights during ANN learning (until the output bound or weight bound is reached).

However, increasing the weights in this manner has several notable drawbacks. For instance, the RPU devices themselves have a limited weight range that can be used for ANN training. Namely, the weight range (resistance values) of the RPU devices are limited in a bounded range with limited and finite state resolution. The RPU devices also have a limited number of states (for just coding a gain). Further, many updates may be necessary, and doing so can undesirably accelerate drift. There is also a high cost (in terms of the number of updates needed) associated with maintaining large weights, especially when the weights decay/drift to zero.

Also, with convolutional neural networks multiple rows of the weight matrix code for different output features (channels) and one row (input) includes multiple input channels. The SNR per output channel i is:

$$SNR_i \approx \frac{|y_i|}{\sigma \max(|(x_j)|)}. \quad (2)$$

Thus, if the output signal is a small $|y_i|$ (such as for the backward cycle pass), then the noise management (which just divides by the absolute maximum over all inputs) can be biased towards high amplitude input channels, while most low amplitude input is suppressed and buried in the noise floor.

Advantageously the present techniques overcome these noise and signal bound limitations by computing and storing the mean and variance over multiple input values and/or sets of input values, and updating the mean and variance in a running average fashion to normalize the inputs to the RPU array (e.g., to a zero mean and variance). See, for example, methodology 200 of FIGS. 2A-C for ANN training with noise and signal management.

Figure 2A:
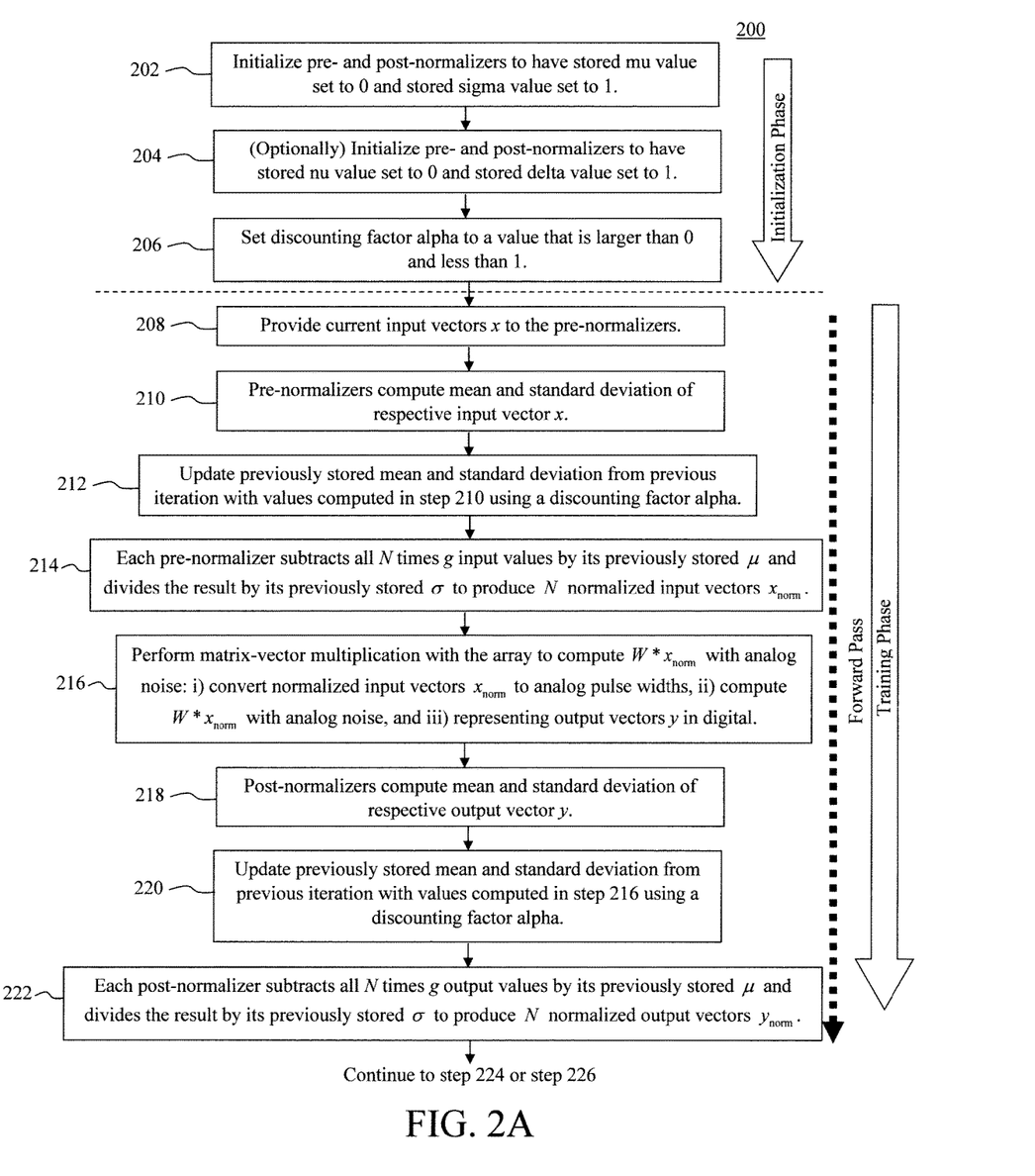
FIG. 2A is a diagram illustrating an Initialization Phase and forward cycle pass of a Training Phase of an exemplary methodology 200 for ANN training with noise and signal management according to an embodiment of the present invention.
Figure 2B:
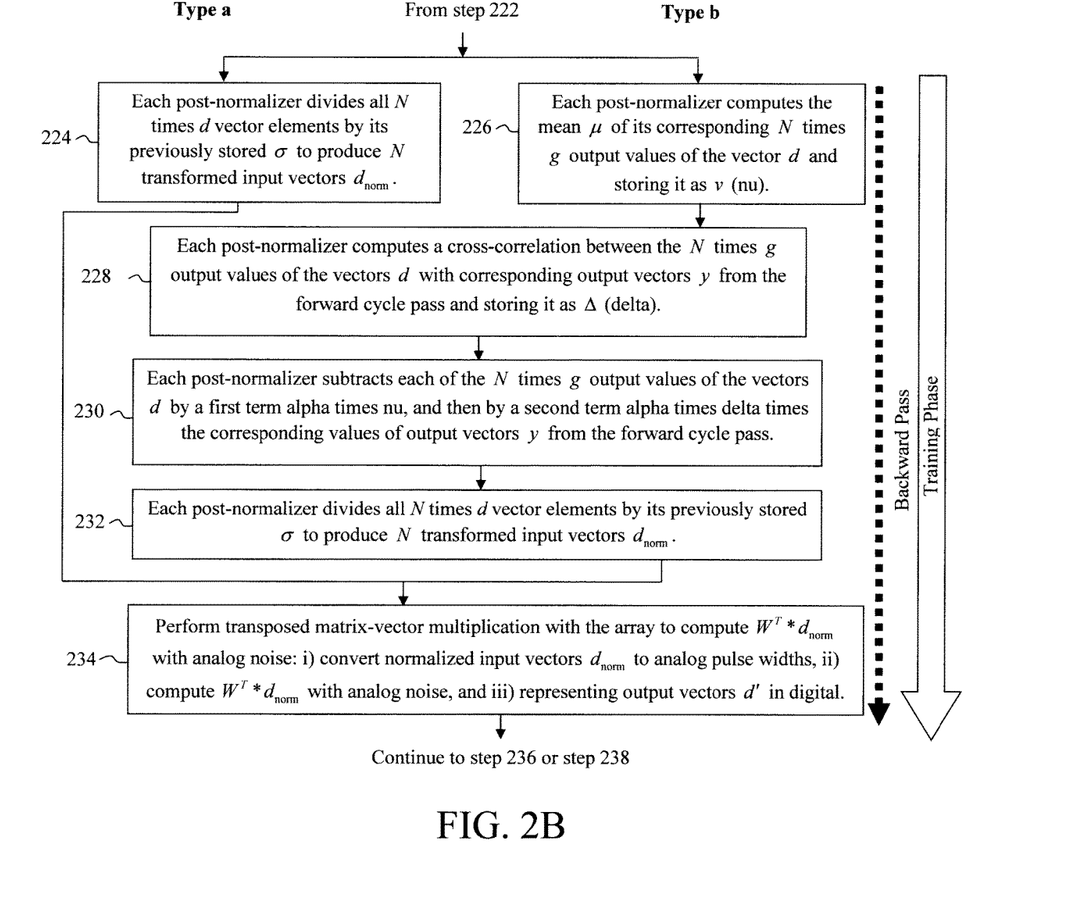
FIG. 2B (continuing from FIG. 2A) is a diagram illustrating a backward cycle pass of the Training Phase of exemplary methodology 200 according to an embodiment of the present invention.
Figure 2C:
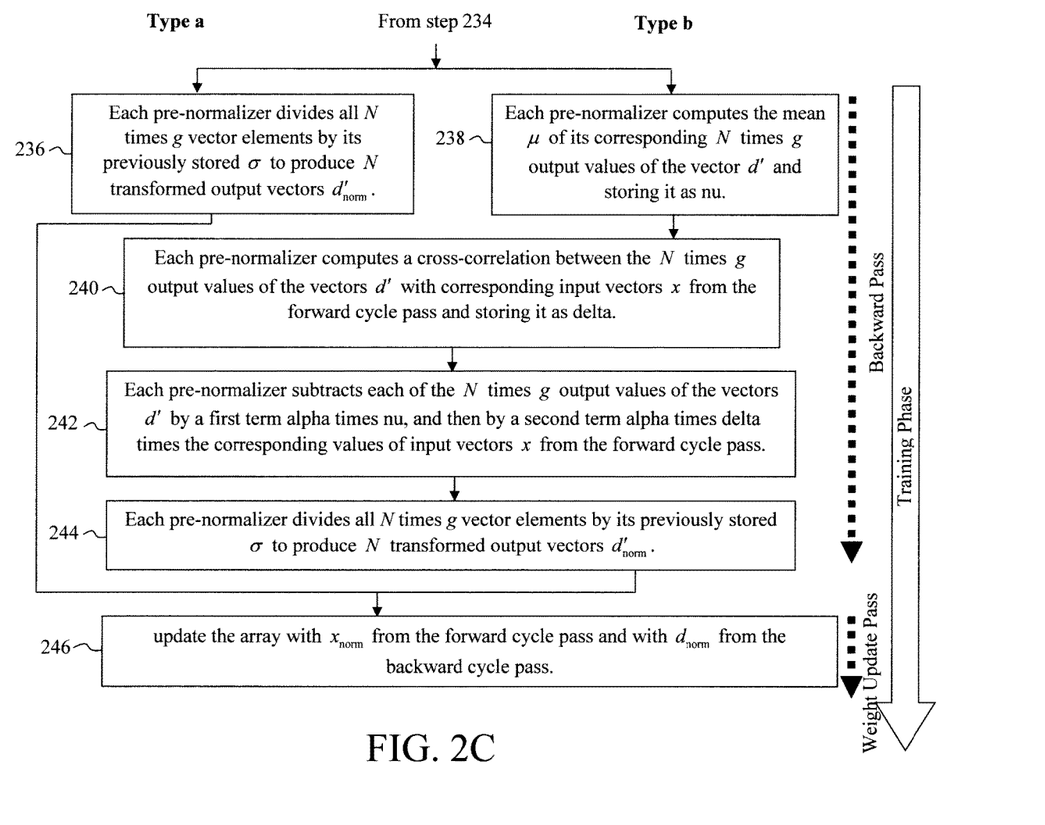
FIG. 2C (continuing from FIG. 2B) is a diagram illustrating continuation of the backward cycle pass and an Update Pass of the Training Phase of exemplary methodology 200 according to an embodiment of the present invention.
Figure 3:
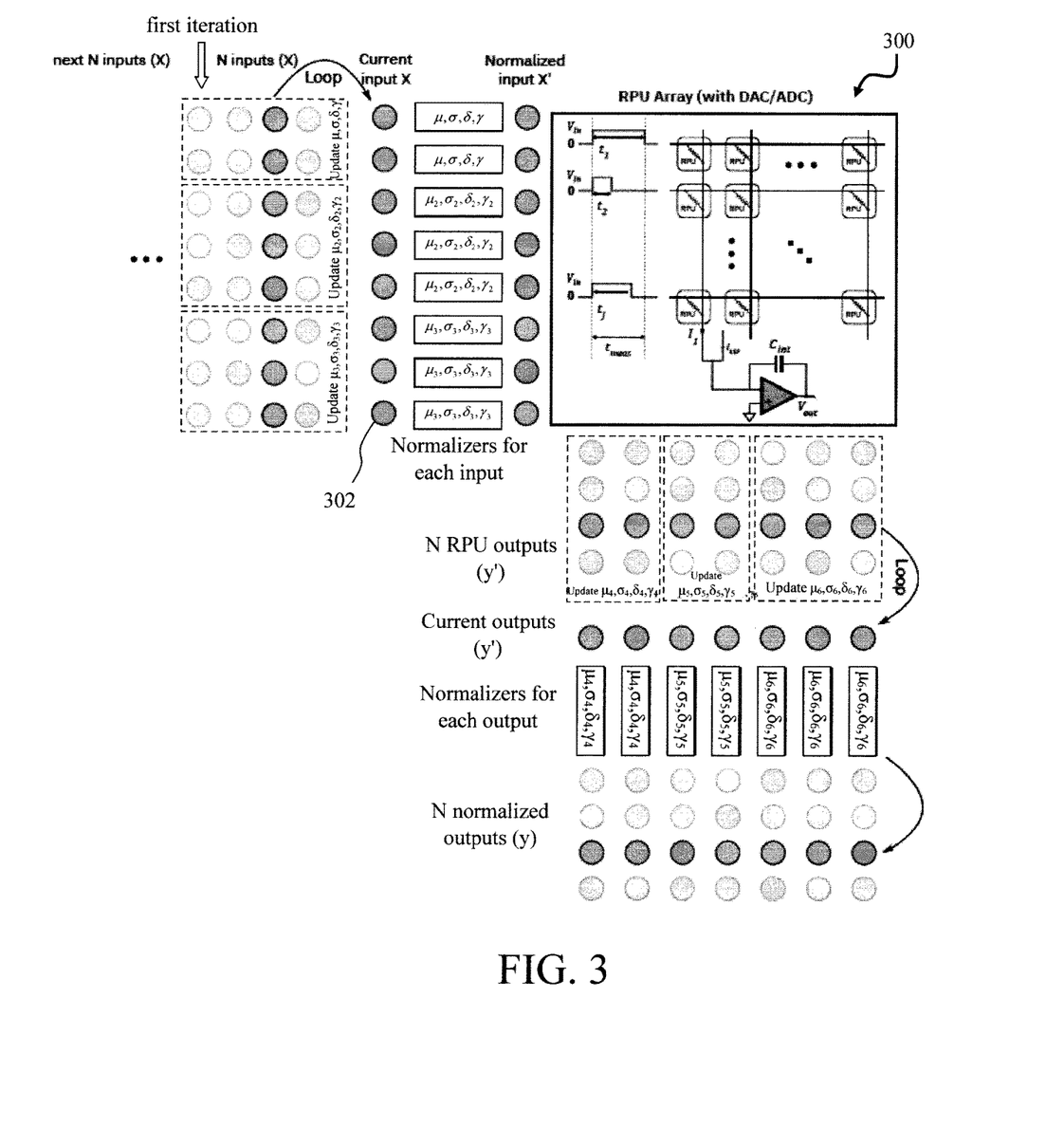
FIG. 3 is a diagram illustrating an exemplary RPU array with pre-normalizers and post-normalizes in which methodology 200 can be implemented according to an embodiment of the present invention.

As shown in FIGS. 2A-C, methodology 200 has an Initialization Phase followed by a Training Phase having a Forward Cycle Pass, a Backward Cycle Pass, and a Weight Update Pass. An RPU array is used to represent a weight matrix W of the ANN having m rows and n columns. See, for example, RPU array 300 in FIG. 3. As described in conjunction with the description of FIG. 1 above, the weight values w of weight matrix W are stored as the resistive values of the RPU devices (labeled "RPU") in array 300. As shown in FIG. 3, normalizers are provided for each input to array 300 (labeled "Normalizers for each input") which are also referred to herein as "pre-normalizers" as well as for each output from array 300 (labeled "Normalizers for each output") which are also referred to herein as "post-normalizers"). According to an exemplary embodiment, the pre-normalizers and post-normalizers are controlled by hardware outside of the RPU array, for example, such as apparatus 400 described in conjunction with the description of FIG. 4, below, with which the pre-normalizers and post-normalizers can exchange data.

In general, pre-normalization of each input signal can be represented as:

$$x_i' = \frac{x_i - \mu_i^{pre}}{\sigma_i^{pre}} \quad (3)$$

and the post-normalization of each output signal can be represented as:

$$y_i' = \frac{y_i - \mu_i^{post}}{\sigma_i^{post}}. \quad (4)$$

As highlighted above, and as will be described in detail below, the value of mean $\mu_i$ (mu) and variance (i.e., standard deviation) $\sigma_i$ (sigma) of a (pre-/post-) normalizer i will be estimated by some (leaky) running average of inputs $z \in Z_i^t$ (t is the current iteration/batch), wherein $Z_i^t$ is either: 1) single current inputs:

$$Z_i^t = x_i^{t-a}, \quad (5)$$

with integer $a \leq 0$, 2) a batch of values from a single input, but including preceding time steps:

$$Z_i^t = \{x_i^{t-a}, x_i^{t-a+1}, \ldots, x_i^{t-a+b}\}, \quad (6)$$

with integer $a \leq 0$ and $b \leq a$, and/or 3) when $\mu_i$, $\sigma_i$ are shared by a group of inputs, $Z_i^t$ includes all of the input batches of the shared group of inputs, e.g., $$Z_1^t \leftarrow Z_1^t \cap Z_2^t \quad (7)$$

if inputs 1 and 2 are grouped. In Equations 10-12 above, x is replaced with y' for the $\mu$ and $\sigma$ of the post-normalizers.

Each parameter is $\mu_i$ updated according to $\mu_i \leftarrow \beta \mu_i + \alpha \langle z \rangle_{z \in Z_i^t}$ periodically (e.g., once for every a–b time steps), wherein $\langle z \rangle_{z \in Z_i^t}$ denotes the mean of the $z \in Z_i^t$. The quantities $\sigma_i$ are also updated periodically (e.g., once for every a–b time steps) using the same data set $Z_i^t$ but computing $v_i \leftarrow \beta v_i + \alpha \langle (z-\mu_i)^2 \rangle_{z \in Z_i^t}$ and $\sigma_i = \sqrt{v_i + \epsilon}$, with $\epsilon \geq 0$. $\alpha$ and $\beta$ are parameters that are shared among all normalizers on the pre-normalizer and post-normalizer side but can be different for the pre-versus post-normalizers. If not specified otherwise, $\beta$ is given by $1-\alpha$.

Referring to methodology 200, as shown in FIG. 2A the Initialization Phase begins in step 202 by initializing the $n^{pre}$ (an integer number between 0 and the n input values) pre-normalizers (see FIG. 3) to all have their respective stored $\mu$ (mu) value set to 0 and their respective stored $\sigma$ (sigma) value set to 1, and initializing the $m^{post}$ (an integer number between 0 and the m output values) post-normalizers (see FIG. 3) to all have their respective stored $\mu$ value set to 0 and their respective stored $\sigma$ value set to 1.

Optionally, in step 204 the pre-normalizers are initialized to all have their respective stored (running mean factor) v (nu) value set to 0 and their respective stored (cross-correlation factor) $\Delta$ (delta) value set to 1, and the post-normalizers are initialized to all have their respective stored v value set to 0 and their respective stored $\Delta$ value set to 1. Step 204 is optional since it depends on which backward cycle pass type a) or b) is chosen (see below). For instance, the initialization of v and $\Delta$ in the pre- and post-normalizers is needed only if backward cycle pass type b) is chosen.

Each of the pre-normalizers is configured to handle a group of n elements of an input vector to the array 300, and the group of the n elements that is handled by each pre-normalizer is fixed hereafter. Likewise, each of the post-normalizers is configured to handle a group of m elements of an output vector from the array 300, and the group of the m elements that is handled by each post-normalizer is fixed hereafter.

In step 206, the discounting factor $\alpha$ (alpha) (see above) to a value that is larger than 0 and less than 1. This value is the same for all normalizers of one side (e.g., pre-) but might be separately chosen for pre-versus post-normalizers. If not specified otherwise, $\beta$ is given by $1-\alpha$. The Initialization Phase (performed in steps 202-206) is now complete. It is notable that, according to an exemplary embodiment, one or more steps of the Initialization Phase and/or the Training Phase are performed outside of the of the RPU array hardware, for example, by an apparatus such as apparatus 400 described in conjunction with the description of FIG. 4, below.

As shown in FIG. 2A, the next phase of methodology 200 is the Training Phase. As provided above, ANN training can involve a SGD process with backpropagation. Generally, backpropagation is performed in three cycles, a forward cycle, a backward cycle, and a weight update cycle which are repeated multiple times (multiple iterations) until a convergence criterion is met. For a general description of the cycles used during backpropagation, see for example, U.S. patent application Ser. No. 16/400,674 by Tayfun Gokmen, entitled "DNN Training with Asymmetric RPU Devices," the contents of which are incorporated by reference as if fully set forth herein.

As shown in FIG. 2, the Training Phase begins with a forward cycle pass. In accordance with the present techniques, in each iteration i of the forward cycle pass, N input vectors x (e.g., a mini-batch) are stored, e.g., in a digital hardware with random access memory. Each input vector x has n elements. In step 208, the current input vectors x are provided to the pre-normalizers (see FIG. 3 "Current input x" wherein each circle 302 represents a separate input vector x to RPU array 300). As highlighted above, multiple iterations of the process are performed. In the inner loop of iterations, the current input vectors x are the first inputs to the process (see below). In the outer loop of iterations (e.g., over the mini-batches), the previously stored values are updated in a discounting fashion (see below).

Namely, in step 210 each pre-normalizer computes current values of the mean $\mu$ and the standard deviation $\sigma$ of all the elements n of the current input vector x that belong to its set group across all N vectors. If its set group size is g, then the mean $\mu$ and the standard deviation $\sigma$ are thus computed over N times g input values. If N and g is 1, then the running average and standard deviations are computed using the previously stored values for the mean $\mu$ and standard deviation $\sigma$.

The N times g input values are then pre-normalized using the mean $\mu$ and standard deviation $\sigma$ stored for the pre-normalizers that have been discounted by a discounting factor $\alpha$. For instance, according to an exemplary embodiment, in step 212, each pre-normalizer updates the previously stored $\mu$ and $\sigma$, if any, from the last (previous) iteration i by the newly computed values (from step 210) in a discounting fashion with discounting factor $\sigma$ (alpha), that is, taking one minus alpha times the old (previously stored) value $v_{old}$ plus alpha times the new value $v_{new}$, i.e., $(1-\alpha)*v_{old}+\alpha*v_{new}$, and store the updated result. In step 214, each pre-normalizer subtracts all N times g input values by its stored $\mu$ and divides the result by its stored $\sigma$. See, e.g., Equation 8, above. Together the pre-normalizers produce N normalized input vectors $x_{norm}$.

For each of the N normalized input vectors $x_{norm}$ (see FIG. 3 "Normalized input x'"), matrix-vector multiplication is then performed with the array 300 to compute $W*x_{norm}$ with analog noise. See step 216. According to an exemplary embodiment, step 216 includes i) converting the N normalized input vectors $x_{norm}$ to analog pulse widths (using, e.g., a digital-to-analog converter (DAC) (not shown)), ii) compute $W*x_{norm}$, with analog noise via array 300 (analog computation is always noisy), and iii) representing output vectors y from the array 300 in digital (using, e.g., an analog-to-digital converter (ADC) (not shown)). All N output vectors y are now stored in digital format as y vectors. For vectors stored in digital, a DAC and ADC are generally needed. However, if $N*g=1$, it is possible to forgo analog and digital conversion.

In step 218, each post-normalizer computes current values of the mean $\mu$ and the standard deviation $\sigma$ of all the elements of the current output vector y (see, e.g., "Current outputs y' in FIG. 3) that belong to its set group across all N vectors. If its set group size is g, then the mean μ and the standard deviation σ are thus computed over N times g output values. If N and g is 1, then running average and standard deviations are computed using the previously stored values for the mean μ and standard deviation σ.

The N times g output values are then post-normalized using the mean μ and standard deviation σ stored for the post-normalizers that have been discounted by the discounting factor α. For instance, according to an exemplary embodiment, in step 220, each post-normalizer updates the previously stored μ and σ, if any, from the last (previous) iteration i by the newly computed values (from step 218) in a discounting fashion with discounting factor σ (alpha), i.e., as above, taking one minus alpha times the old (previously stored) value $v_{old}$ plus alpha times the new value $v_{new}$, i.e., $(1-\alpha)+\alpha^*v_{new}$, and store the updated result. In step 222, each post-normalizer subtracts all N times g output values by its stored μ and divides the result by its stored σ. See, e.g., Equation 9, above.

Together the post-normalizers produce N normalized output vectors $y_{norm}$. These normalized output vectors $y_{norm}$ represent the final output of the RPU array 300 hardware (for one ANN layer) and, e.g., an activation function or another layer might be computed next.

As shown in FIG. 2B (which continues from FIG. 2A), the Training Phase next involves a backward cycle pass. In each iteration i of the backward cycle pass, N input vectors d are stored (e.g., in the digital part of the hardware, passed back from the next higher layer). Each input vector d has m elements.

Generally, with the backward cycle pass if x' is the already normalized input and d' the gradient input, then the backward cycle pass output d is either:

$$d_i = \frac{d_i'}{\sigma_i}, \text{ or} \quad (8)$$

$$d_i = \frac{d_i' - \alpha(v_i + x_i'\gamma_i)}{\sigma_i}, \quad (9)$$

where sets of ordered inputs $D'^t_i$ and $X'^t_i$ are composed (with identical ordering) as described for $Z^t_i$ above, but from the normalized inputs $x'^t$ and gradient inputs $d'^t$ instead. α is the same discounting factor as described for the forward pass above. Parameters $v_i$ are periodically updated and computed as $\mu_i \leftarrow \beta^*\mu_i+\alpha^*\langle d\rangle_{d\in D_i^t}$ wherein $\beta^*$ and $\alpha^*$ are fixed parameters, e.g., $\beta^*=0$ and $\alpha^*=1$, which per default equal to $1-\alpha$ and α, respectively. Quantities $\gamma_i$ are periodically updated and computed as $\gamma_i \leftarrow \beta^*\gamma_i+\alpha^*\langle x'd\rangle_{x'\in x'^t_i, d\in D_i^t}$, wherein the product is meant to be only along the pairs of x' and d that correspond to each other in the two ordered sets. Analogously, for the post-normalization step, the normalized output signals y and the corresponding gradient input are taken instead of the x' and d'.

As highlighted above, in accordance with the present techniques, two different types of the backward cycle pass are contemplated, and referred herein to as backward cycle pass type a) and type b). Each scenario involves transforming the input vectors d of the backward cycle pass using the previous standard deviation σ for the post-normalizers from the last post-normalize iteration to produce N transformed input vectors $d_{norm}$. Namely, in one exemplary embodiment, the backward cycle pass type a) begins in step 224 with each post-normalizer dividing all N times d of the d vector elements by its previously stored σ (from the last post-normalize iteration and discounted) using its corresponding element-grouping, whereby together the post-normalizers produce N transformed input vectors $d_{norm}$.

Alternatively, in another exemplary embodiment, the backward cycle pass type b) begins in step 226 with each post-normalizer computing the mean μ of its corresponding N times g output values of the vector d and storing μ as v (nu), thereby discounting the old value of v with the discounting factor α. If the N times g output value is 1, a running mean is computed using the previous value of v (from the last post-normalize iteration and discounted). In step 228, a cross-correlation between the N times g output value of the vectors d with the corresponding values of output vectors y during the forward cycle pass is computed. This is stored as Δ delta, thereby discounting the old value of Δ with discounting factor α. If the N times g output value is 1, a running cross-correlation is computed using the previous value of Δ (from the last post-normalize iteration and discounted). In step 230, each of the N times g output values of the vectors d are subtracted by a first term computed as alpha times nu, and then by a second term computed as alpha times delta times the corresponding element value of the y vectors from the forward pass. Finally, in step 232 each post-normalizer divides all N times d of the d vector elements by its previously stored σ (from the last post-normalize iteration and discounted) using its corresponding element-grouping, whereby together the post-normalizers produce the N transformed input vectors $d_{norm}$.

With either backward cycle pass type a) or type b), for each of the N transformed input vectors $d_{norm}$, transposed matrix-vector multiplication is then performed with the array 300 to compute $W^T*d_{norm}$ analog noise. See step 234. According to an exemplary embodiment, step 234 includes i) converting the N transformed input vectors $d_{norm}$ to analog pulse widths (using, e.g., a digital-to-analog converter (DAC) (not shown)), ii) compute $W^T*d_{norm}$ with analog noise via array 300, and iii) representing output vectors d' from the array 300 back in digital (using, e.g., an analog-to-digital converter (ADC) (not shown)). All N output vectors d' are now stored in digital format.

Following the transposed matrix-vector multiplication, the operations of the pre-normalizers again depends on which backward cycle pass type a) or type b) was selected. If backward cycle pass type a) was selected in step 224, then the process proceeds in the same manner using the type a) backward cycle pass. Conversely, if backward cycle pass type b) was selected in steps 226-232, then the process proceeds in the same manner using the type b) backward cycle pass. Each scenario involves transforming the output vectors d' of the backward cycle pass using the previous standard deviation σ for the pre-normalizers from the last pre-normalize iteration to produce N transformed output vectors $d'_{norm}$. All of the pre-normalizers together produce N transformed output vectors $d'_{norm}$ which represents the final output of the RPU hardware (for one ANN layer) during the backward cycle pass. See FIG. 2C (which continues from FIG. 2B). Namely, in one exemplary embodiment, the backward cycle pass type a) continues in step 236 with each pre-normalizer dividing all N times g of the d' vector elements by its previously stored σ (from the last pre-normalize iteration and discounted) using its corresponding element-grouping, whereby together the pre-normalizers produce N transformed output vectors $d'_{norm}$.

Alternatively, in another exemplary embodiment, the backward cycle pass type b) continues in step 238 with each pre-normalizer computing the mean µ of its corresponding N times g output values of the vector d' and storing p as v (nu), thereby discounting the old value of v with the discounting factor α. If the N times g output value is 1, a running mean is computed using the previous value of v (from the last post-normalize iteration and discounted). In step 240, a cross-correlation between the N times g output value of the vectors d' with the corresponding values of input vectors x during the forward cycle pass is computed. This is stored as Δ, thereby discounting the old value of Δ with discounting factor α. If the N times g output value is 1, a running cross-correlation is computed using the previous value of Δ (from the last pre-normalize iteration and discounted). In step 242, each of the N times g output values of the vectors d' are subtracted by a first term computed as alpha times nu, and then by a second term computed as alpha times delta times the corresponding element value of the x vectors from the forward pass. Finally, in step 244 each pre-normalizer divides all N times d of the d' vector elements by its previously stored σ (from the last pre-normalize iteration and discounted) using its corresponding element-grouping, whereby together the post-normalizers produce the N transformed input vectors $d'_{norm}$.

As shown in FIG. 2C, the Training Phase next involves a Weight Update Cycle pass. Namely, the RPU array 300 is updated with the $x_{norm}$ and $d'_{norm}$ vectors computed during the forward cycle and backward cycle passes, respectively. After the training phase is completed, the system can also run in Inference mode. In this mode, no update phase or backward phase is done. Instead, only the forward pass is computed as described above, except that all the stored values of all the pre- or post-normalizers are not updated anymore and only the stored values of the pre- and post-normalizers from the previous training phase are used for the normalization steps.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
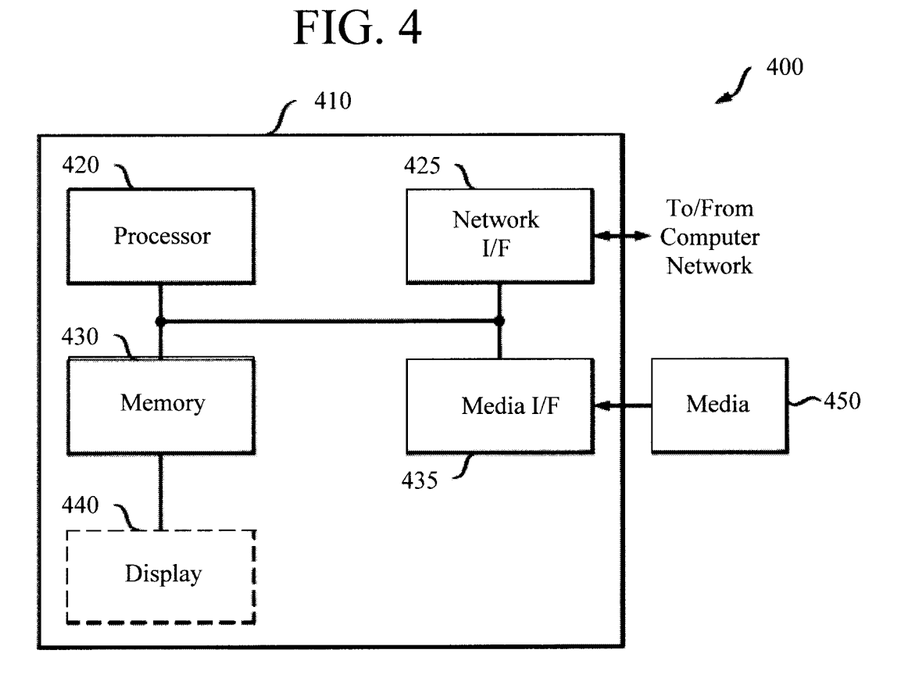
FIG. 4 is a diagram illustrating an exemplary apparatus that can be employed in carrying out one or more of the present techniques according to an embodiment of the present invention.

Turning now to FIG. 4, a block diagram is shown of an apparatus 400 for implementing one or more of the methodologies presented herein. By way of example only, apparatus 400 can be configured to perform one or more steps of methodology 200 of FIGS. 2A-C.

Apparatus 400 includes a computer system 410 and removable media 450. Computer system 410 includes a processor device 420, a network interface 425, a memory 430, a media interface 435 and an optional display 440. Network interface 425 allows computer system 410 to connect to a network, while media interface 435 allows computer system 410 to interact with media, such as a hard drive or removable media 450.

Processor device 420 can be configured to implement the methods, steps, and functions disclosed herein. The memory 430 could be distributed or local and the processor device 420 could be distributed or singular. The memory 430 could be implemented as an electrical, magnetic or optical memory, or any combination of these or other types of storage devices. Moreover, the term "memory" should be construed broadly enough to encompass any information able to be read from, or written to, an address in the addressable space accessed by processor device 420. With this definition, information on a network, accessible through network interface 425, is still within memory 430 because the processor device 420 can retrieve the information from the network. It should be noted that each distributed processor that makes up processor device 420 generally contains its own addressable memory space. It should also be noted that some or all of computer system 410 can be incorporated into an application-specific or general-use integrated circuit.

Optional display 440 is any type of display suitable for interacting with a human user of apparatus 400. Generally, display 440 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for artificial neural network (ANN) training with noise and signal management, the method comprising the steps of:

providing an array of resistive processing unit (RPU) devices with pre-normalizers configured to handle a set group of size g of n elements of an input vector x to the array and post-normalizers configured to handle a set group of size g of m elements of an output vector y from the array, wherein the array represents a weight matrix W of the ANN having m rows and n columns, and wherein weight values w of weight matrix W are stored as resistive values of the RPU devices;

computing a mean μ and a standard deviation σ of all elements of the input vector x that belong to the set group of each of the pre-normalizers across N vectors producing current mean μ and standard deviation σ values for the pre-normalizers, wherein the mean μ and the standard deviation σ are computed over N times g input values;

updating previously stored mean μ and standard deviation σ values for the pre-normalizers with a discounting factor α and the current mean μ and standard deviation σ values for the pre-normalizers producing updated stored mean μ and standard deviation σ values for the pre-normalizer;

pre-normalizing the N times g input values using the updated stored mean μ and standard deviation σ values for the pre-normalizers producing N normalized input vectors $x_{norm}$ from all of the pre-normalizers, to compute $W*x_{norm}$ with analog noise in a forward cycle pass through the array;

computing the mean μ and the standard deviation σ of all elements of the output vector y that belong to the set group of each of the post-normalizers across the N vectors producing current mean μ and standard deviation σ values for the post-normalizers, wherein the mean μ and the standard deviation σ are computed over N times g output values;

updating previously stored mean μ and standard deviation σ values for the post-normalizers with the discounting factor α and the current mean μ and standard deviation σ values for the post-normalizers producing updated stored mean μ and standard deviation σ values for the post-normalizer;

post-normalizing the N times g output values using the updated stored mean μ and standard deviation σ values for the post-normalizers producing N normalized output vectors $y_{norm}$ from all of the post-normalizers;

transforming N input vectors d using the previous standard deviation σ producing N transformed input vectors $d_{norm}$ to compute $W^T*d_{norm}$ with analog noise in a backward cycle pass through the array; and transforming N output vectors d' using the previous standard deviation σ for the pre-normalizers to produce N transformed output vectors $d'_{norm}$.

2. The method of claim 1, further comprising the step of: initializing each of the pre-normalizers and the post-normalizers to have a stored mean value set to 0, and a stored standard deviation value set to 1.

3. The method of claim 1, further comprising the step of: updating the array in an update cycle pass with $x_{norm}$ from the forward cycle pass and with $d_{norm}$ from the backward cycle pass.

4. The method of claim 1, further comprising the step of: updating the previously stored mean μ and standard deviation σ values for the pre-normalizers using the discounting factor α as $(1-\alpha)*v_{old}+\alpha*v_{new}$, wherein $v_{old}$ is the previous mean and standard deviation for the pre-normalizers, and $v_{new}$ is the mean and standard deviation computed for the elements of the input vector x.

5. The method of claim 4, further comprising the step of: initially setting the discounting factor σ to a value that is larger than 0 and less than 1.

6. The method of claim 1, further comprising the step of: updating the previously stored mean μ and standard deviation σ values for the post-normalizers using the discounting factor α as $(1-\alpha)*v_{old}+\alpha*v_{new}$, wherein $v_{old}$ is the previous mean and standard deviation for the post-normalizers, and $v_{new}$ is the mean and standard deviation computed for the elements of the output vector y.

7. The method of claim 6, further comprising the step of: initially setting the discounting factor σ to a value that is larger than 0 and less than 1.

8. The method of claim 1, wherein the pre-normalizing step comprises the steps of:
subtracting, for each of the pre-normalizers, the N times g values by the previous mean μ of the pre-normalizers to obtain a result; and
dividing the result by the previous standard deviation σ of the pre-normalizers.

9. The method of claim 1, further comprising the steps of:
converting the N normalized input vectors $d_{norm}$ to analog pulse widths;
computing $W^T*d_{norm}$ with analog noise using the array; and
representing the output vector y from the array in digital.

10. The method of claim 1, further comprising the steps of:
converting the N normalized input vectors $x_{norm}$ to analog pulse widths;
computing $W*x_{norm}$ with analog noise using the array; and
representing the N output vectors d' from the array in digital.

11. The method of claim 1, wherein the step of transforming the N input vectors d comprises the step of:
dividing the N input vectors d by the previous standard deviation σ for the post-normalizers to produce the N transformed input vectors $d_{norm}$.

12. The method of claim 1, further comprising the step of: initializing each of the pre-normalizers and post-normalizers to have a stored value v set to 0, and a stored value Δ set to 1.

13. The method of claim 12, wherein the step of transforming the N input vectors d comprises the steps of:
computing v, via the post-normalizers, as the mean μ of the N times g output values of the N input vectors d;
computing, via the post-normalizers, a cross-correlation A between the N times g output values of the N input vectors d with values of the output vector y from the forward cycle pass;
subtracting, via the post-normalizers, each of the N times g output values of the N input vectors d by a first term computed as α times v, and then by a second term computed as α times Δ times the values of the output vector y from the forward cycle pass; and
dividing the N input vectors d by the previous standard deviation σ for the post-normalizers to produce the N transformed input vectors $d_{norm}$.

14. The method of claim 11, wherein the step of transforming the N output vectors d' of the backward cycle pass comprises the step of:
dividing the N input vectors d by the previous standard deviation σ for the post-normalizers to produce the N transformed input vectors $d_{norm}$.

15. The method of claim 13, wherein the step of transforming the N output vectors d' comprises the steps of:
computing v, via the post-normalizers, as the mean μ of the N times g output values of the N input vectors d;
computing, via the post-normalizers, a cross-correlation A between the N times g output values of the N input vectors d with values of the output vector y from the forward cycle pass;
subtracting, via the post-normalizers, each of the N times g output values of the N input vectors d by the first term computed as α times v, and then by the second term computed as α times Δ times the values of the output vector y from the forward cycle pass; and
dividing the N input vectors d by the previous standard deviation σ for the post-normalizers to produce the N transformed input vectors $d_{norm}$.

16. A method for ANN training with noise and signal management, the method comprising the steps of:
providing an array of RPU devices with pre-normalizers configured to handle a set group of size g of n elements of an input vector x to the array and post-normalizers configured to handle a set group of size g of m elements of an output vector y from the array, wherein the array represents a weight matrix W of the ANN having m rows and n columns, and wherein weight values w of weight matrix W are stored as resistive values of the RPU devices;
computing a mean μ and a standard deviation σ of all elements of the input vector x that belong to the set group of each of the pre-normalizers across N vectors producing current mean μ and standard deviation σ values for the pre-normalizers, wherein the mean μ and the standard deviation σ are computed over N times g input values;
updating previously stored mean μ and standard deviation σ values for the pre-normalizers with a discounting factor α and the current mean μ and standard deviation σ values for the pre-normalizers producing updated stored mean μ and standard deviation σ values for the pre-normalizer;
pre-normalizing the N times g input values using the updated stored mean μ and standard deviation σ values for the pre-normalizers producing N normalized input vectors $x_{norm}$ from all of the pre-normalizers, to compute $W*x_{norm}$ with analog noise in a forward cycle pass through the array;
computing the mean μ and the standard deviation σ of all elements of the output vector y that belong to the set group of each of the post-normalizers across the N vectors producing current mean μ and standard deviation σ values for the post-normalizers, wherein the mean μ and the standard deviation σ are computed over N times g output values;

updating previously stored mean μ and standard deviation σ values for the post-normalizers with the discounting factor α and the current mean μ and standard deviation σ values for the post-normalizers producing updated stored mean μ and standard deviation σ values for the post-normalizer;

post-normalizing the N times g output values using the updated stored mean μ and standard deviation σ values for the post-normalizers producing N normalized output vectors $y_{norm}$ from all of the post-normalizers;

transforming N input vectors d using the previous standard deviation σ producing N transformed input vectors $d_{norm}$ to compute $W^T*d_{norm}$ with analog noise in a backward cycle pass through the array by dividing the N input vectors d by the previous standard deviation σ for the post-normalizers to produce the N transformed input vectors $d_{norm}$; and transforming N output vectors d' using the previous standard deviation σ for the pre-normalizers to produce N transformed output vectors $d'_{norm}$ by dividing the N input vectors d by the previous standard deviation σ for the post-normalizers to produce the N transformed input vectors $d_{norm}$.

17. The method of claim 16, further comprising the steps of:
converting the N normalized input vectors $d_{norm}$ to analog pulse widths;
computing $W^T*d_{norm}$, with analog noise using the array; and
representing the output vector y from the array in digital.

18. The method of claim 16, further comprising the steps of:
converting the N normalized input vectors $x_{norm}$ to analog pulse widths;
computing $W*x_{norm}$ with analog noise using the array; and
representing the N output vectors d' from the array in digital.

19. A method for ANN training with noise and signal management, the method comprising the steps of:
providing an array of RPU devices with pre-normalizers configured to handle a set group of size g of n elements of an input vector x to the array and post-normalizers configured to handle a set group of size g of m elements of an output vector y from the array, wherein the array represents a weight matrix W of the ANN having m rows and n columns, and wherein weight values w of weight matrix W are stored as resistive values of the RPU devices;
initializing each of the pre-normalizers and post-normalizers to have a stored value v set to 0, and a stored value Δ set to 1;
computing a mean μ and a standard deviation σ of all elements of the input vector x that belong to the set group of each of the pre-normalizers across N vectors producing current mean μ and standard deviation σ values for the pre-normalizers, wherein the mean μ and the standard deviation σ are computed over N times g input values;
updating previously stored mean μ and standard deviation σ values for the pre-normalizers with a discounting factor α and the current mean μ and standard deviation σ values for the pre-normalizers producing updated stored mean μ and standard deviation σ values for the pre-normalizer;

pre-normalizing the N times g input values using the updated stored mean μ and standard deviation σ values for the pre-normalizers producing N normalized input vectors $x_{norm}$ from all of the pre-normalizers, to compute $W*x_{norm}$ with analog noise in a forward cycle pass through the array;

computing the mean μ and the standard deviation σ of all elements of the output vector y that belong to the set group of each of the post-normalizers across the N vectors producing current mean μ and standard deviation σ values for the post-normalizers, wherein the mean μ and the standard deviation σ are computed over N times g output values;

updating previously stored mean μ and standard deviation σ values for the post-normalizers with the discounting factor α and the current mean μ and standard deviation σ values for the post-normalizers producing updated stored mean μ and standard deviation σ values for the post-normalizer;

post-normalizing the N times g output values using the updated stored mean μ and standard deviation σ values for the post-normalizers producing N normalized output vectors $y_{norm}$ from all of the post-normalizers;

transforming N input vectors d using the previous standard deviation σ producing N transformed input vectors $d_{norm}$ to compute $W^T*d_{norm}$ with analog noise in a backward cycle pass through the array by i) computing v as the mean μ of the N times g output values of the N input vectors d, computing a cross-correlation A between the N times g output values of the N input vectors d with values of the output vector y from the forward cycle pass, subtracting each of the N times g output values of the N input vectors d by a first term computed as α times v, and then by a second term computed as α times Δ times the values of the output vector y from the forward cycle pass, and dividing the N input vectors d by the previous standard deviation σ for the post-normalizers to produce the N transformed input vectors $d_{norm}$; and transforming N output vectors d' using the previous standard deviation σ for the pre-normalizers to produce N transformed output vectors $d'_{norm}$ by computing v as the mean μ of the N times g output values of the N input vectors d, computing a cross-correlation A between the N times g output values of the N input vectors d with values of the output vector y from the forward cycle pass, subtracting each of the N times g output values of the N input vectors d by the first term computed as α times v, and then by the second term computed as α times Δ times the values of the output vector y from the forward cycle pass, and dividing the N input vectors d by the previous standard deviation σ for the post-normalizers to produce the N transformed input vectors $d_{norm}$.

20. The method of claim 19, further comprising the steps of:
converting the N normalized input vectors $d_{norm}$ to analog pulse widths;
computing $W^T*d_{norm}$ with analog noise using the array; and
representing the output vector y from the array in digital.

21. The method of claim 19, further comprising the steps of:
- converting the N normalized input vectors $x_{norm}$ to analog pulse widths;
- computing $W*x_{norm}$ with analog noise using the array; and
- representing the N output vectors d' from the array in digital.

22. A computer program product for ANN training with noise and signal management, the computer program product comprising a computer readable storage medium having program instructions embodied therewith, the program instructions executable by a computer to cause the computer to perform the steps of:
- using an array of RPU devices with pre-normalizers configured to handle a set group of size g of n elements of an input vector x to the array and post-normalizers configured to handle a set group of size g of m elements of an output vector y from the array to represent a weight matrix W of the ANN having m rows and n columns, wherein weight values w of weight matrix W are stored as resistive values of the RPU devices;
- computing a mean $\mu$ and a standard deviation $\sigma$ of all elements of the input vector x that belong to the set group of each of the pre-normalizers across N vectors producing current mean $\mu$ and standard deviation $\sigma$ values for the pre-normalizers, wherein the mean $\mu$ and the standard deviation $\sigma$ are computed over N times g input values;
- updating previously stored mean $\mu$ and standard deviation $\sigma$ values for the pre-normalizers with a discounting factor $\alpha$ and the current mean $\mu$ and standard deviation $\sigma$ values for the pre-normalizers producing updated stored mean $\mu$ and standard deviation $\sigma$ values for the pre-normalizer;
- pre-normalizing the N times g input values using the updated stored $\mu$ and standard deviation $\sigma$ values for the pre-normalizers producing N normalized input vectors $x_{norm}$ from all of the pre-normalizers, to compute $W*x_{norm}$ with analog noise in a forward cycle pass through the array;
- computing the mean $\mu$ and the standard deviation $\sigma$ of all elements of the output vector y that belong to the set group of each of the post-normalizers across the N vectors producing current mean $\mu$ and standard deviation $\sigma$ values for the post-normalizers, wherein the mean $\mu$ and the standard deviation $\sigma$ are computed over N times g output values;
- updating previously stored mean $\mu$ and standard deviation $\sigma$ values for the post-normalizers with the discounting factor $\alpha$ and the current mean $\mu$ and standard deviation $\sigma$ values for the post-normalizers producing updated stored mean $\mu$ and standard deviation $\sigma$ values for the post-normalizer;
- post-normalizing the N times g output values using the updated stored mean $\mu$ and standard deviation $\sigma$ values for the post-normalizers producing N normalized output vectors $y_{norm}$ from all of the post-normalizers;
- transforming N input vectors d using the previous standard deviation $\sigma$ producing N transformed input vectors $d_{norm}$ to compute $W^T*d_{norm}$ with analog noise in a backward cycle pass through the array; and
- transforming N output vectors d' using the previous standard deviation $\sigma$ for the pre-normalizers to produce N transformed output vectors $d'_{norm}$.

* * * * *